July 31, 1923.
A. D. PIDGEON
1,463,660
SHOCK ABSORBER FOR AUTOMOBILES
Filed Jan. 26, 1922
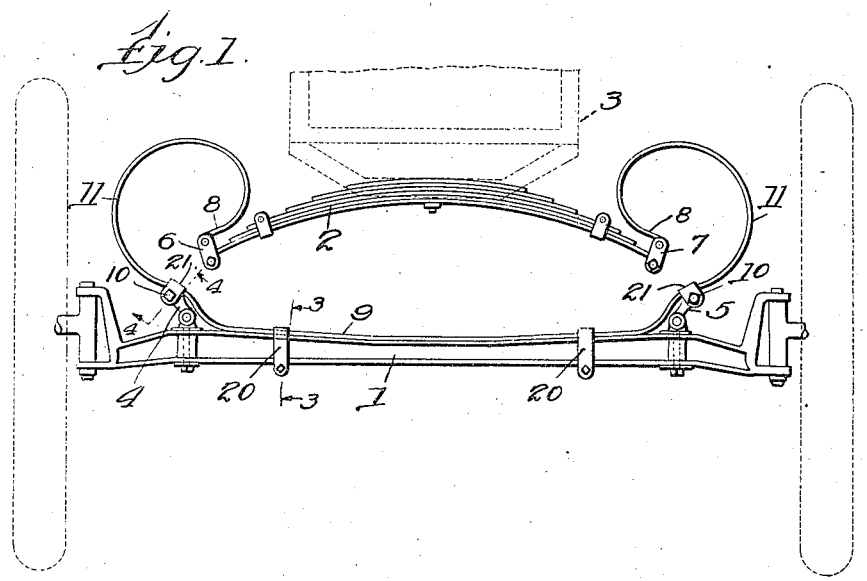
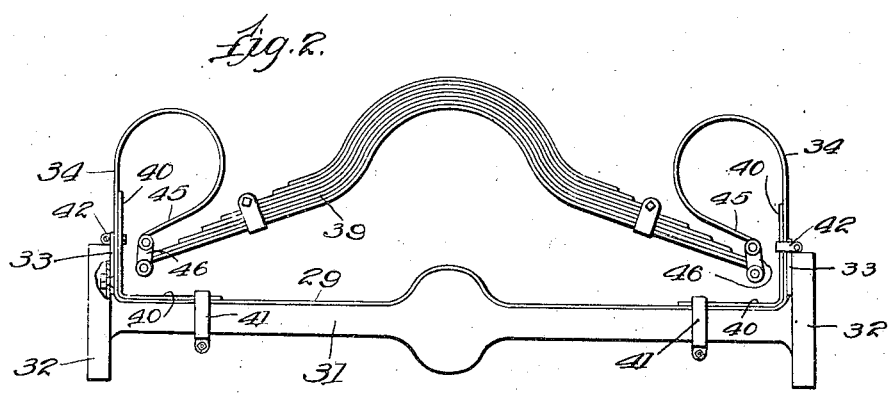
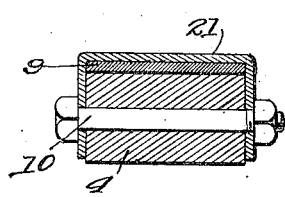

Patented July 31, 1923.

1,463,660

UNITED STATES PATENT OFFICE.

ANDREW D. PIDGEON, OF CHICAGO, ILLINOIS.

SHOCK ABSORBER FOR AUTOMOBILES.

Application filed January 26, 1922. Serial No. 531,859.

*To all whom it may concern:*

Be it known that I, ANDREW D. PIDGEON, a citizen of the United States, residing in the city of Chicago and the State of Illinois, have invented certain new and useful Improvements in Shock Absorbers for Automobiles, of which the following is a specification, reference being had to the accompanying drawings, forming a part thereof.

The purpose of this invention is to provide an auxiliary mount for a vehicle spring adapted to improve the flexing action of the spring and also to check and diminish the rebound or recoil effect. It consists of the features and elements in combination hereinafter described and shown in the drawings as indicated by the claims.

In the drawings:—

Fig. 1 is a view of the front axle and spring of a well-known type of automobile showing a device embodying this invention as applied therebetween.

Fig. 2 is similarly an embodiment, but shown as applied to the rear axle and serving the rear spring.

Figs. 3 and 4 are views taken as indicated at the lines 3 and 4 respectively on Fig. 1.

The drawing shows in Fig. 1 the front axle 1, the usual transverse spring 2, which is located above the axle and shown, as secured as is usual, to the body 3, of the vehicle. At 4 and 5 are shown the usual hanger brackets, but which for the present purpose have been rotated in their respective bearings in the axle 1, 180 degrees, so that they now trend away from each other, and the shackles 6 and 7 have been disassociated therefrom and swung up for connection to the ends 8—8 of a spring 9, whose purpose and action will be hereinafter explained.

The said spring 9 is secured to the axle 1 in any convenient manner that will effectively prevent its being rocked on the axle out of its proper plane, such securing means may be the "U-shaped" clamps 20, which are located intermediate the brackets 4 and 5 but preferably reasonably close thereto so as to co-act with the clamps 21—21, which are secured to the brackets by bolts 10, as seen in Fig. 3; the co-action between the two clamps or clips 20 and 21 is that they will effectively prevent the spring 9 with its upcurved or looped parts 11 from becoming dislodged from its proper position in a plane coincident with the axle 1 and the spring 2, as would tend to occur under sudden stress due to overcoming the inertia of the vehicle body, as in starting or stopping.

It will be noticed that the clips 20 and 21 are in horizontal planes, one below the other, and that the point of suspension for the spring 2 by the shackle 6 is in a plane above both of these anchoring points, thereby providing a rigid and reliable means of mounting these associated parts in their proper relative position.

To further contribute toward the rigidity of the assembly, the spring 9 is formed of a single piece, terminating in the loops, as seen, and extending along the axle 1, to which it may be secured at as many points as prove most effective.

As seen in Fig. 2, the spring 29 which is secured by clips 41 to the rear axle-housing 31 and extending therealong as shown, terminates in rather a sharper curve or bend than the front spring 9, which is necessitated by the relative lengths of the body-spring 39 and the housing 31. The housing 31 is shown as integral with the brake-drum-housing 32, to which is rigidly attached by bolts or other securing means, an upwardly extending anchoring post 33; this post 33 serving as a means of mounting in a vertical position the upturned portions 34 of the spring 29.

It will be understood that the main springs 2 and 29 are designed to withstand a maximum load without over-deflection, that is, to still have the capacity of further deflection under sudden shocks as in traversing an uneven roadbed, and are therefore necessarily rather rigid and since, in the design herein illustrated, they are comparatively short it follows that there is a good deal left to be desired in easy riding qualities; to supply this is one of the objects of the present invention.

The devices here applied are each made of spring material that will start to deflect under less load than that required to flex the main springs and are so designed that when their capacity is reached the load then imposed will begin to act on the main springs in a well understood manner, and upon further increment of load the ends of the main springs may even rest upon the axles, particularly in the case of the rear spring which is subject to a greater variation of loading.

The device applied to the rear springs (see Fig. 2) is reinforced because of the above referred to varient loading, by supplying an L-shaped reinforcing strip 40, which is secured in position to the housing 31 by the clips 41—41 and to the upstanding member 33 by the clips 42—42.

Each loop of the spring 29 terminates in a substantially straight portion 45, which like the part 8 of the spring 9 is positioned to overlie the end of the main spring, thus adding length and resiliency thereto; the end thereof is connected to the main spring by the shackles 46.

A further object of this invention is to provide means for "snubbing" or absorbing the shock of the rebound of the vehicle following a sudden violent, extreme deflection of the main spring. It will be readily seen that a superimposed load will operate to open the loops or bends, that is, causing the ends 8—8 or 45—45 to approach the axles, while by virtue of the form of the loop it is adapted to resistingly operate in a reverse direction, the resistance yieldingly permitting the vehicle-body to rise without experiencing any undesirable definite stop, but gradually absorbing the upward momentum imparted to the vehicle-body, thus relieving the passengers of the disagreeable bouncing action, to say nothing of racking of the vehicle parts.

It will be seen that devices made according to the foregoing constitute inexpensive, easily applied and thoroughly dependable means of obtaining the ends sought, i. e., of affording easy riding qualities to a vehicle.

I claim:

1. In an automobile shock absorber and snubber, a supplemental spring introduced between the axle and the main spring of the vehicle, said supplemental spring arranged to overlie the axle and contiguous thereto between two longitudinally separated points of attachment, two upstanding brackets rigidly associated with the said axle, said brackets each having an eye, a bolt therethrough, said bolt arranged to secure a spring-holding clip; said clip being positioned in a plane above or vertically removed from the first mentioned attaching point; the supplemental spring extending upwardly from the said brackets and terminating at a point above both other said attachment points; said uppermost point providing means for supporting the main vehicle spring.

2. In an automobile shock absorber and snubber, a supplemental spring positioned between the axle and the main spring of the vehicle, spring-securing brackets secured to the axle and arising therefrom for providing attaching means for the supplemental springs at a point intermediate its two other points of securement, one of which is at the axle and the other of said two points being the end of the main spring of the vehicle.

In testimony whereof, I have hereunto set my hand, at Chicago, Illinois, this 21st day of January, 1922.

ANDREW D. PIDGEON.